Jan. 13, 1970  B. V. GIEGERICH  3,489,019
HERMETIC SEAL AND SHAFT ASSEMBLY
Filed Feb. 10, 1969
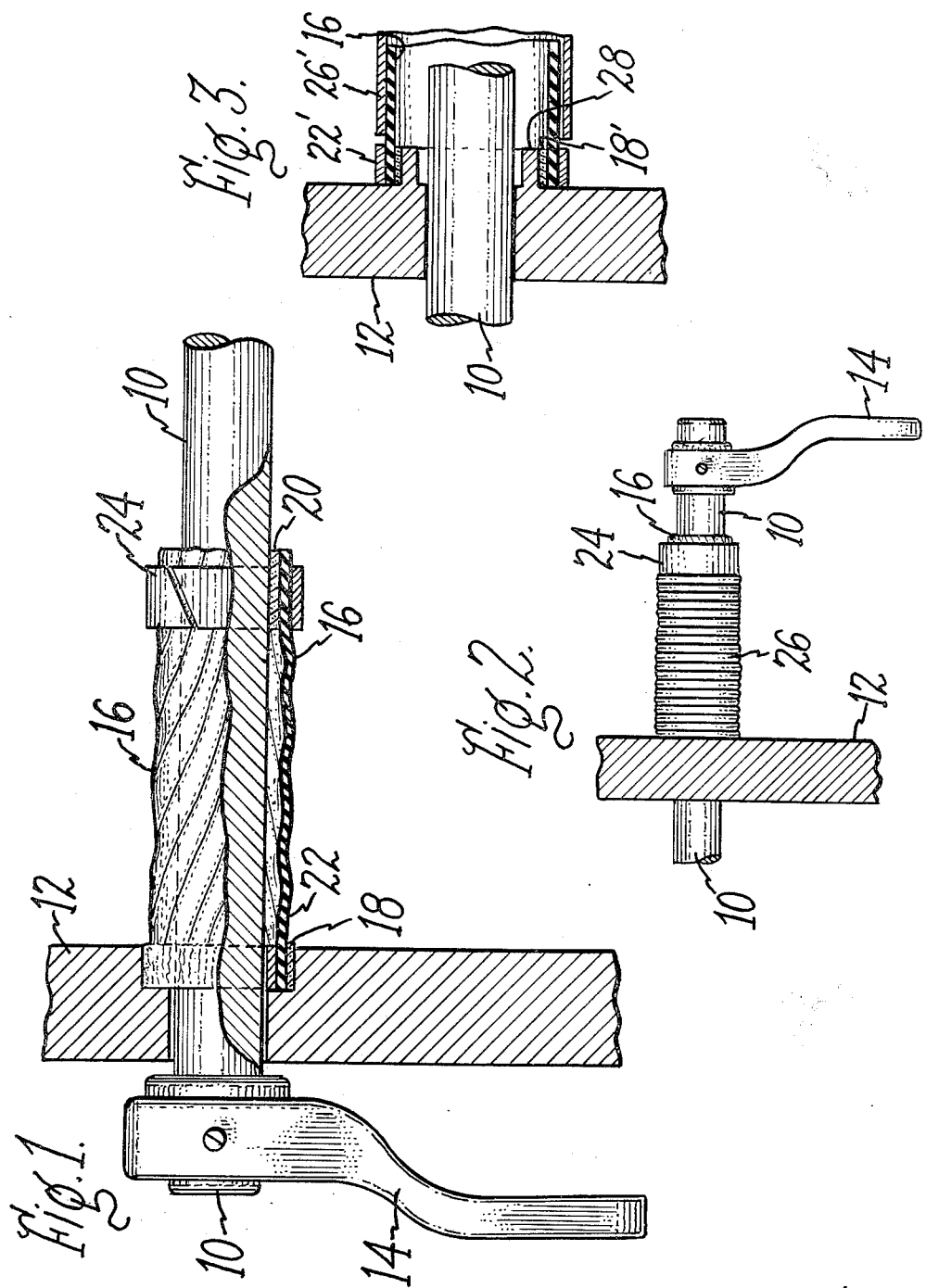
Inventor,
Bertrand V. Giegerich,
by Francis V. Doyle
His Attorney.

United States Patent Office 3,489,019
Patented Jan. 13, 1970

3,489,019
HERMETIC SEAL AND SHAFT ASSEMBLY
Bertrand V. Giegerich, Pittsfield, Mass., assignor to General Electric Company, a corporation of New York
Continuation-in-part of application Ser. No. 623,451, Mar. 15, 1967. This application Feb. 10, 1969, Ser. No. 801,924
Int. Cl. F16j 15/50
U.S. Cl. 74—18
3 Claims

ABSTRACT OF THE DISCLOSURE

An hermetic seal and shaft assembly in which a flexible, elastic synthetic rubber member, in the form of a tube, is threaded over the shaft and in contact with a wall member or the like through which the shaft extends. One end of the flexible tube is hermetically sealed to the shaft by a metal to plastic resinous adhesive. The other end is hermetically sealed to the wall by the same metal to plastic resinous adhesive. Clamps may be provided at each end, if desired. As the shaft rotates, the flexible tube twists between the shaft and the wall member providing an hermetic seal between such members.

BACKGROUND OF INVENTION

This application is a continuation-in-part of application Ser. No. 623,451, filed Mar. 15, 1967 now abandoned for Hermetic Seal for Rotatable Shaft which is assigned to the same assignee as this invention.

This invention relates to sealing and more particularly to means for providing the hermetic sealing of rotatable shafts.

It is well known that increasing interest is being shown in hermetically sealed devices. This interest is clearly apparent in the electrical distribution field where greater use is being made of hermetically sealed transformers and the like. These hermetically sealed transformers are found mounted on poles, on pads at ground level, and in vaults or chambers, below ground level. This latter type is generally referred to as subway or underground transformers. The subway, or underground transformer requires an hermetic seal because it may often be covered with water in its vault or chamber.

The term "hermetic seal" or "hermetically sealed" as used throughout this specification and claims means a seal which will be operative up to at least a temperature of 135° C. and which will pass less than $10^{-5}$ cc. of helium per second at full vacuum or at 15 p.s.i. pressure. At the present time such hermetic seals are normally only obtained through metallic bonding, such as welding.

In many types of sealed devices, it is often necessary to perform some action within the sealed device through operation of a movable handle or the like on the exterior of the device. This is especially true in hermetically sealed transformers where switches must be opened or closed or taps changed within the transformer. In all such instances, it is necessary that the hermetic seal be maintained.

Many types of seals are known which include various types of packing, clamp devices and O-rings which are used to seal a rotatable shaft. However, many of these are inadequate for long time use and do not provide a true hermetic seal. For instance, in the O-ring and other types of packing, the seal is a high friction seal which tends to wear in the small pressure areas of contact. Further, the high pressure seal sometimes makes it difficult for performing the desired function within the sealed device. Other types of sealing means are known which do provide an hermetic seal, but many are too expensive and cumbersome to use. A special problem arises in hermetically sealed transformers, in that many times the sealing means must be in contact with the liquid insulation of the transformer which may be, for example, a mineral oil. As is well known, during transformer operation, the liquid insulation may become very hot, reaching the vicinity of 125 to 140° C. Thus, there is presently a need for a simple, inexpensive hermetic sealing means which will provide a low friction seal, having a great resistance to wear, and one which will not be affected by liquid insulation, especially a hot liquid insulation.

It is therefore one object of this invention to provide an hermetic seal for rotatable shafts which does not rely on pressure for sealing.

A further object of this invention is to provide an hermetic seal for rotatable shafts which will not be affected by hot, liquid insulation.

A still further object of this invention is to provide a simple, inexpensive hermetic seal for rotatable shafts which will not rely on pressure and which will provide great resistance to wear and which will be a very low friction seal.

SUMMARY OF INVENTION

Briefly, in one form, this invention comprises a shaft member rotatably mounted in a fixed member and extending therethrough. Means are provided on the shaft for rotating the shaft. Sealing means are provided giving an hermetic seal between the fixed member and the shaft. The sealing means is in the form of a flexible, elastic tube which surrounds the shaft and has one end hermetically sealed to the fixed member by a resinous adhesive. The other end of the tube is hermetically sealed to the rotatable shaft by a resinous adhesive.

It is believed that this invention, and the manner in which the objects and advantages thereof are obtained, as well as other objects and advantages thereof, will be better understood by reference to the following detailed description of a preferred embodiment, particularly when considered in the light of the accompanying drawing.

BRIEF DESCRIPTION OF DRAWING

FIGURE 1 is a side view, partially in section, showing one preferred form of the hermetic seal according to this invention;

FIGURE 2 is a side view, on a reduced scale, showing a slight modification and an added feature of the hermetic seal of this invention; and FIGURE 3 is a partial side view showing a further modification of the form of hermetic seal shown in FIGURE 1.

DESCRIPTION OF PREFERRED EMBODIMENT

The invention herein shown and described provides an hermetic seal and shaft assembly. Briefly, the invention comprises a flexible, elastic tube member which surrounds the rotatable shaft and has one end hermetically sealed to the shaft by a resinous adhesive. The other end of the tube is hermetically sealed to a fixed member through which the shaft extends by a like resinous adhesive. The tube is thus hermetically sealed between the shaft and the fixed member allowing the shaft to rotate but retaining an hermetic seal between the shaft and the fixed member.

Referring now to the drawing, in which like numerals are used to indicate like parts throughout, and with particular reference to FIGURE 1, this invention is shown in a preferred form as a rotatable shaft 10 passing through a fixed member 12. Rotatable shaft 10 is provided with an operating handle 14 which is fixed thereto, for example by means of a set screw. In the embodiment shown in FIGURE 1, the operating handle 14 is mounted on shaft 10 on one side of the fixed member 12. Fixed member 12 may be the wall or cover of a transformer or the like while the shaft 10 may be connected to a switch or the like within the transformer. In the instance shown in FIGURE 1, the transformer or the like may be filled with a liquid insulation which would surround the shaft 10 on the side of the fixed member opposite the handle 14. In accordance with this invention, it is required that shaft 10 be hermetically sealed to the fixed member 12, while still allowing the shaft 10 to be rotated to the extent required to operate the switch by operation of the handle 14.

In the preferred form of the invention shown in FIGURE 1, an hermetic seal is obtained by means of a flexible elastic tube 16 which is preferably a synthetic rubber material, which is not affected by high temperature liquid. A presently preferred form of synthetic rubber is a copolymer of hexafluropropylene and vinylidene fluoride, which is not affected by temperatures up to at least 600° F. This type of material is presently sold under the trade name Viton. The elastic tube 16 is placed around the shaft 10 as shown. One end of elastic tube 16 is hermetically sealed to fixed member 12 in a cavity or depression by a resinous adhesive 18, such as for example, an epoxy resin. The other side of elastic tube 16 is hermetically sealed to shaft 10 also by a resinous adhesive 20 which is preferably the same as adhesive 18.

The adhesive 18 and 20 hermetically seal the tube 16 to both shaft 10 and fixed member 12. Due to the elasticity of tube 16, the shaft 10 may be rotated by handle 14 without disturbing the hermetic seal. As will be apparent, as shaft 10 is rotated, the end of tube 16 hermetically sealed to shaft 10 will also rotate. The other end of tube 16 hermetically sealed to member 12 will remain fixed. The tube 16 will thus be stretched or flexed between its ends retaining the desired hermetic seal at both ends of tube 16. As will be apparent, the flexibility of tube 16 may be increased by increasing the length of the tube between its hermetically sealed ends. The length of the tube 16 will depend on the amount of rotation required of shaft 10. Where shaft 10 only rotates through 60° or 90°, as in a switch closing or opening, the tube 16 may be substantially the same length as the distance between the hermetically sealed ends. However, if the shaft must rotate through approximately 360°, as in a tap changer, the length of tube 16 should be substantially greater than the distance between the hermetically sealed ends to provide additional flexibility without placing an undue strain on the hermetically sealed ends.

If desired, to relieve tearing stresses on the hermetically sealed ends of tube 16, clamping members may be provided. As is shown in FIGURE 1, an internal clamp 22 is provided inside tube 16 clamping the end of tube 16 to fixed member 12 within the depression. The other end of tube 16 is clamped to shaft 10 by means of an external clamp 24.

Of course, it will be obvious that the hermetic seal could be placed externally of the sealed container if desired. This type of hermetic seal is shown in FIGURE 2 wherein shaft 10 extends through a fixed member 12 which may be a wall or cover of a transformer or other hermetically sealed device. As shown in FIGURE 2, the end of shaft 10 extending to the left of member 12 is considered the internal portion of the hermetically sealed device. The opposite end of shaft 10 extending to the right of member 12 and including flexible tube 16 and handle 14 is considered the external portion of the hermetically sealed device. The hermetic seal is the same as that previously described with reference to FIGURE 1.

Also shown in FIGURE 2 is a loosely mounted external coil spring 26 which surrounds the flexible elastic tube 16. This spring 26 restrains the elastic tube 16 from ballooning under pressure. Obviously, a similar spring could be provided to the seal of FIGURE 1 when such hermetic seal is mounted internally of the hermetically sealed device. In the internal hermetic seal, tube 16 may be subjected to ballooning due to vacuum conditions. The coil spring 16 would be equally effective in either case. Obviously, a metal tube, such as tube 26' of FIGURE 3 could be provided in place of spring 26.

FIGURE 3 shows an hermetic seal similar to that shown in FIGS. 1 and 2. However, in FIGURE 3, instead of hermetically sealing in a cavity or depression of fixed member 12, the flexible elastic tube 16 is hermetically sealed to a boss or bearing 28 in fixed member 12 which may be on the internal or external side of member 12. The flexible tube 16 is hermetically sealed to the boss or bearing 28 by an epoxy resin 18' as shown. If desired, a clamping ring such as 22' may be provided to relieve the tearing stress on tube 16. Of course, in this construction, the clamping member will be on the outside of tube 16 as shown. As will be apparent, the other end of tube 16 will be hermetically sealed to shaft 10 in the same manner as discussed with reference to FIGURE 1. Also shown in FIGURE 3 is a loosely fitting metal tube 26' which will restrain plastic tube 16 from ballooning, as previously described.

From the above description, it will be clear that there is disclosed a novel hermetic seal and shaft assembly which does not rely on pressure for its sealing. Obviously, such hermetic seal will be a low friction hermetic seal and will be less subjected to wear since there are no pressure areas for wear. While there has been shown and described the present preferred embodiment of the hermetic seal of this invention, it will be apparent that various changes may be made in the details thereof without departing from the spirit and scope of the invention.

What is claimed as new and which it is desired to secure by Letters Patent of the United States is:

1. An hermetic seal and shaft assembly in a fixed member comprising:
    (a) a rotatable shaft,
    (b) a fixed member through which said rotatable shaft extends,
    (c) hermetic sealing means between said shaft and said fixed member comprising:
        (1) a flexible elastic tube surrounding said shaft,
        (2) one end of said tube hermetically sealed to said fixed member by a resinous adhesive,
        (3) the other end of said tube hermetically sealed to said shaft with a resinous adhesive,
    (d) and a metallic member loosely mounted externally of said tube to prevent ballooning of said tube.

2. An hermetic seal and shaft assembly as claimed in claim 1 in which clamping means are provided clamping one end of said tube to said fixed member and the other end of said tube to said shaft to relieve tearing stresses on such tube.

3. An hermetic seal and shaft assembly as claimed in claim 1 in which said fixed member is provided with a bearing and said elastic tube is hermetically sealed to said bearing by said resinous adhesive.

References Cited

UNITED STATES PATENTS

| | | | |
|---|---|---|---|
| 1,807,139 | 5/1931 | Volodimirov | 74—18.1 |
| 3,028,761 | 4/1962 | Cole | 74—18 X |

MILTON KAUFMAN, Primary Examiner